United States Patent [19]

Höfgen et al.

[11] Patent Number: 4,677,441
[45] Date of Patent: Jun. 30, 1987

[54] TWO-WAY RANGING SYSTEM

[75] Inventors: Günter Höfgen, Kornwestheim; Helmut Euler, Weil der Stadt, both of Fed. Rep. of Germany

[73] Assignee: International Standard Electric Corporation, New York, N.Y.

[21] Appl. No.: 693,549

[22] Filed: Jan. 22, 1985

[30] Foreign Application Priority Data

Feb. 4, 1984 [DE] Fed. Rep. of Germany ....... 3403947

[51] Int. Cl.$^4$ .......................... G01S 13/80; G01S 7/40
[52] U.S. Cl. ...................................... 342/174; 342/51; 342/125
[58] Field of Search ............ 343/17.7, 6.5 R, 6.5 LL, 343/6.8 R, 6.8 LL, 12 R, 5 W, 352, 358, 458; 342/42, 46, 47, 49, 51, 174, 125, 352, 353, 357, 358, 453, 458

[56] References Cited

U.S. PATENT DOCUMENTS

| 3,124,799 | 3/1964 | Hagedorn et al. | 343/358 |
| 3,237,192 | 2/1966 | Stansell, Jr. et al. | 343/352 |
| 3,728,728 | 4/1973 | Vogel | 343/6.5 R X |
| 4,126,859 | 11/1978 | Bohm | 342/47 X |

OTHER PUBLICATIONS

Lassiter et al, "NAVSTAR/GPS: Operational Stans", Journal of Navigation, vol. 30, No. 1, Jan./77.
D. R. Prunty, "Automatic Transponder Calibration in PME Ranging Systems", IBM Technical Disclosure Bulletin, vol. 21, #2, Jul. 1978.

Primary Examiner—T. H. Tubbesing
Assistant Examiner—Gilberto Barrón, Jr.
Attorney, Agent, or Firm—T. L. Peterson

[57] ABSTRACT

A two-way ranging system in which deviations of transmit times of interrogation signals from a nominal transit time are determined at a transponder. These deviations are dependent upon the propagation conditions for interrogation and reply signals in the medium of propagation. A normally fixed delay is developed in the transponder. This fixed delay occurs between the reception of an interrogation signal and the transmission of a reply signal. This fixed delay is so shortened as to compensate for transit time deviations of the interrogation and reply signals.

10 Claims, 4 Drawing Figures

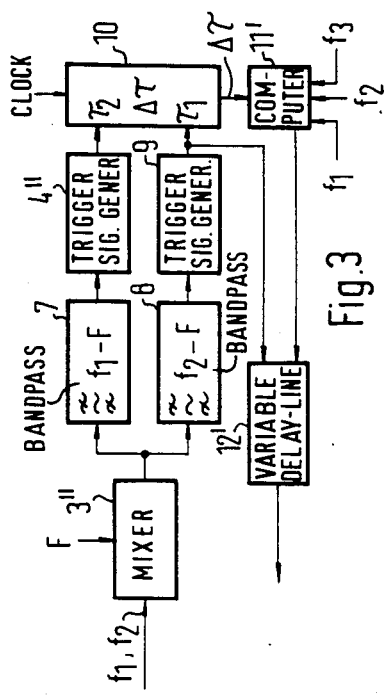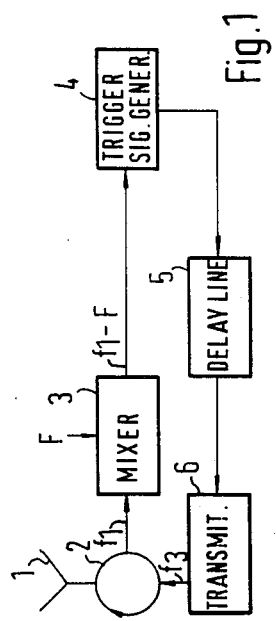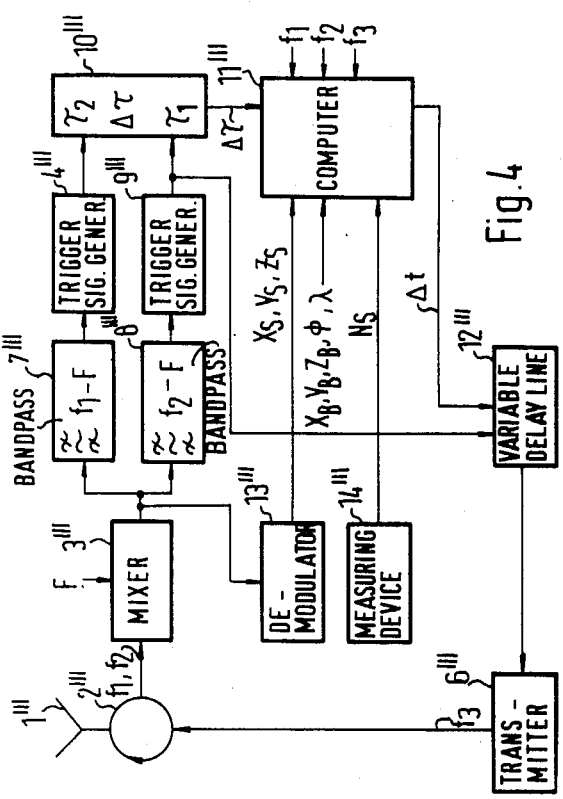

TWO-WAY RANGING SYSTEM

BACKGROUND OF THE INVENTION

The present invention relates to a two-way ranging system, and more particularly to propagation delay deviation correction devices for such a system.

PRIOR ART STATEMENT

In a book by E. Kramar, "Funksysteme fur Ortung und Navigation", Verlag Berliner Union GmbH, Stuttgart, 1973, pp. 147-159, a two-way ranging system DME (distance-measuring equipment) is described, in which the interrogation and reply signals consist of pulse pairs.

In the use of a DME equipment, measuring accuracy is affected by errors caused by multipath propagation. Measures are known by which such errors can be reduced.

If an interrogator and a transponder are so located in relation to each other that the signals penetrate the troposphere and the ionosphere, for example, errors are also caused by the propagation conditions for the signals in the media forming the ionosphere and the troposphere. Then, the measured transit time is longer than the transit time in case of straight-line signal propagation (the nominal transit time). The nominal transit time is that on which the distance measurement is based.

It is known that the distances between satellites and ground stations are measured by means of a two-way ranging system.

Deviations of the transit times of signals propagating in the ionosphere and/or troposphere have disturbing effects in other systems, too. In a GPS (Global Positioning System) navigation system, for example, one-way ranging is performed. It is known how transit-time deviations caused by the propagation conditions for the signals in the ionosphere and/or the troposphere can be taken into account during evaluation. Reference is made to an article by E. H. Martin, "GPS User Equipment Error Models", NAVIGATION, Journal of the Institute of Navigation, Vol. 25, No. 2, 1978, pp. 201 to 210 (especially pages 207 to 210), and a report by E. E. Altshuler and P. M. Kalaghan, "Tropospheric Range Error Corrections for the NAVSTAR System", Air Force Cambridge Research Laboratories, AFCRL-TR-74-0198, April 1974. To allow for the "ionospheric error", two signals of different frequency are evaluated for one-way ranging. Compensation for the "tropospheric error" is performed in accordance with the Altshuler model, in which, inter alia, the refractive index of the troposphere and the elevation angle from the measuring station to the station transmitting the signal used for one-way ranging are evaluated.

In a two-way ranging system, unlike in a one-way ranging system, transit-time deviations are present on two signal paths (interrogation and reply signals).

SUMMARY OF THE INVENTION

In accordance with the system of the present invention, the above-described and other disadvantages of the prior art are overcome by delaying a reply signal to compensate for unwanted deviations in interrogator and reply signals.

In the novel two-way ranging system of the present invention, it is an advantage that the instant of reception of a reply signal at the interrogator is already the corrected instant of reception. That is, from the time difference between the transmission of the interrogation signal and the reception of the reply signal, the distance between the interrogator and the transponder can be calculated directly in a manner known per se, taking into account the fixed delay (nominal delay) in the transponder and the built-in equipment delays.

BRIEF DESCRIPTION OF THE DRAWINGS

In the drawings which are to be regarded as merely illustrative:

FIG. 1 is a block diagram of the essential parts of a conventional transponder of a two-way ranging system;

FIG. 2 is a block diagram of one embodiment of a portion of the transponder;

FIG. 3 is a block diagram of another embodiment of another portion of the transponder; and FIG. 4 is a block diagram of a transponder in which the two embodiments of FIGS. 2 and 3 are implemented.

DESCRIPTION OF THE PREFERRED EMBODIMENTS

In the novel two-way ranging system of the present invention, the type of interrogation and reply signals used is of no importance. It is of great importance with regard to the implementation of individual components of the system. As the implementation of the system components is unimportant for the invention, it will not be dealt with here.

The interrogation signals transmitted by an interrogator have a carrier of frequency $f_1$. They are received by an antenna 1 of the transponder (FIG. 1) and fed through a circulator 2 to a mixer 3, where they are combined with a signal of frequency F to produce an IF signal. The IF signal with the frequency $f_1-F$ is applied to a device 4 in which a trigger pulse is derived from the IF signal. The trigger pulse delivered by this device 4 triggers a delay line 5, and the delayed trigger pulse triggers a transmitter 6. The latter generates the reply signal, whose carrier has the frequency $f_3$. The reply signal is applied through the circulator 2 to the antenna 1, which radiates it.

Such a transponder is known per se. Automatic control systems which compensate, for example, for delay variations due to temperature changes or component aging are not discussed here, because they are not necessary for an understanding of the invention. In a complete transponder, however, such automatic control systems are usually present. They are present in addition to the devices which will be explained with the aid of FIG. 2 and/or FIG. 3. In DME, the delay is chosen so that the reply signal is transmitted exactly 50 microseconds after reception of the interrogation signal. In the GRANAS navigation system which is disclosed in German patent application No. 3301613, this delay is 1.2 seconds.

The first embodiment of the invention is shown in FIG. 2 which shows a block diagram of a portion of a transponder. Delay-time deviations caused during signal propagation in the troposphere are compensated for.

In this embodiment, the following information must be available at the transponder:

1. The coordinates $X_B$, $Y_B$, $Z_B$ of the transponder; geographical longitude and geographical latitude of the transponder position;
2. The coordinates $X_S$, $Y_S$, $Z_S$ of the interrogator;
3. The refractive index of the troposphere.

If both the interrogator and the transponder are in motion, each of them must determine its position, and the interrogator position must be transmitted to the transponder.

In the GRANAS navigation system, the interrogator is aboard a satellite, and the transponder is a fixed ground station. Thus, the data specifying the position of the transponder must be determined and stored only once.

In the GRANAS navigation system, the interrogation signals contain the satellite coordinates in coded form. As a result, the satellite position (and, consequently, the interrogator position) is known at the transponder.

The transponder includes a conventional device for measuring the refractive index of the troposphere.

From the values measured by this device, the transit-time deviation $\Delta t''$ of the interrogation signal is determined in accordance with Altshuler's model. $\Delta t''$ is the time by which the interrogation signal is delayed as compared with the delay of the signal arriving over a direct path.

From the measured values, $\Delta t''$ is calculated by the equation $$\Delta t'' = G(\alpha) \cdot H(h) \cdot F(h, Ns) \quad (1)$$

where
α = elevation angle
h = height of satellite above sea level
G, H and F = empirical functions
Ns = refractive index of the troposphere The functions will not be dealt with here because they are known from the report of Altshuler and Kalaghan. They contain empirical values which are determined anew at long time intervals (about 10 years).

The correcting value thus determined, $\Delta t''$, is independent of the frequency of the interrogation signal. The transit-time deviation is present in the case of both the interrogation signal and the reply signal. Therefore, the normally fixed delay, which is the time difference between the reception of the interrogation signal and the transmission of the reply signal, is shortened by $2\Delta t''$. The sum of the transit-time deviations of the interrogation and reply signals, and the delay in the transponder is thus equal to the value which is to be constant. Thus, a correction of the propagation errors is obtained without any additional steps having to be taken at the interrogator.

FIGS. 2, 3 and 4 show how the transponder of FIG. 1 can be modified to correct the tropospheric error.

The output signal of the mixers 3, 3', 3'' and 3''' in FIGS. 1, 2, 3 and 4 are fed not only to the devices 4, 4', 4'' and 4''', respectively, for generating the trigger pulse but also to a demodulator 13 in FIG. 2 and to a demodulator 13''' in FIG. 4. The latter demodulate the received interrogation signal and decode the interrogator coordinates $X_S$, $Y_S$, $Z_S$, which are contained in the interrogation signal. These coordinates are fed to computers 11, 11' and 11''' which also hold the data $X_B$, $Y_B$, $Z_B$, $\phi$, and $\lambda$ for the transponder. The transponder further includes measuring devices 14 and 14''' which measure the refractive index Ns of the troposphere. Ns, too, is fed to the computers 11, 11' and 11'''. In the computer, $2\Delta t''$ is calculated as described above.

While delay line 5 in the transponder of FIG. 1 produces a fixed delay, the novel transponder contains a variable delay line 12. This variable delay line 12 is controlled by the computers 11, 11' and 11''' so as to provide a delay equal to a fixed delay minus $2\Delta t''$.

In the second embodiment, for which a block diagram of a portion of the transponder is shown in FIG. 3, transit-time deviations caused during signal propagation in the ionosphere are compensated for.

It is known that the ionosphere is a dispersive medium. A signal travels in the ionosphere over different paths depending on its frequency. Accordingly, the signal transit time in the ionosphere is frequency-dependent, too.

This property is used to determine a correcting value. Instead of one interrogation signal, the interrogator transmits two interrogation signals with different frequencies $f_1$ and $f_2$. The following is a numerical example:

$f_1 = 1.575$ GHz
$f_2 = 1.228$ GHz
$f_3 = 1.654$ GHz ($f_3$ = frequency of the reply signal)

If transmitted by the interrogator at the same time, the two interrogation signals reach the transponder at the instants $\tau_1$ and $\tau_2$. From these instants (or the difference $\Delta \tau = \tau_1 - \tau_2$) and the frequencies of the interrogation signals, a correcting value $\Delta t$ is determined. If the two interrogation signals are not transmitted simultaneously, this time displacement must be taken into account in the determination of $\Delta \tau$.

The correcting value by which the fixed delay must be reduced is $2\Delta t$, because a transit-time deviation occurs both in the case of the interrogation signal and in the case of the reply signal. The correcting value is $$2\Delta t = \frac{2(\tau_1 - \tau_2)}{\left[1 - \frac{f_1^2}{f_2^2}\right]} = \frac{2\Delta \tau}{\left[1 - \frac{f_1^2}{f_2^2}\right]}$$

As mentioned above, the transit-time deviation is frequency-dependent. Therefore, since the frequency of the reply signal differs from the frequencies of the interrogation signals, a reduction of the fixed delay by $2\Delta t$ gives a correction of the transit-time deviation, but this correction contains an error which is caused by the fact that $f_3$ differs from $f_1$ and $f_2$.

A further improvement in accuracy is obtained if this fact is taken into account in the determination of the correcting value.

As mentioned above, the deviation of the transit time of the interrogation signal is $\Delta t$. The transit-time deviation of the reply signal is then $$\Delta t' = \Delta t \cdot \frac{f_1^2}{f_3^2}$$

To eliminate the transit-time deviations of the interrogation signal and the reply signal, the fixed delay is reduced by $\Delta t + \Delta t'$, i.e., the correcting value is $\Delta t + \Delta t'$.

Possible numerical values of the difference and the correcting value $\Delta t$ at the above frequencies:

$\Delta \tau = -35.3$ ns.
$\Delta t = 10$ ns.

FIG. 3 shows how the transponder of FIG. 1 can be modified to correct the ionospheric error.

Since the transponder receives two interrogation signals with the different frequencies $f_1$ and $f_2$, the mixer 3'' delivers IF signals with the frequencies $f_1 - F$ and $f_2$ —F. The mixer 3" is followed by two bandpass filters 7, 8 each tuned to one of these frequencies. The output signals of the bandpass filters are fed to trigger-signal-generating devices 4" and 9, respectively.

The two trigger signals are applied to a time-measuring device 10, which measures the time difference between the two trigger pulses present at the instants $\tau_1$ and $\tau_2$. It can be implemented as a counter which is started on receipt of the first trigger pulse and stopped on receipt of the second trigger pulse. From the count and the clock frequency at which the counter is driven, the time difference can be derived.

The trigger pulse provided by the trigger-pulse-generating device 9 (instant $\tau_1$) not only is applied to the time-measuring device 10 but also triggers the variable delay line 12'. The delay is controlled by the computer 11', as in the embodiment of FIG. 2. In the embodiment of FIG. 3, the correction of the normally fixed delay is calculated from $\Delta\tau$ and $f_1$ and $f_2$ or from $\Delta\tau$ and $f_1$, $f_2$, and $f_3$, as described above.

Which correction must be performed depends on the application of the two-way ranging system, particularly on where the interrogator and the transponder are located. This is true because the signal propagation paths depend on the positions of these two stations. If the signals must pass through the troposphere and the ionosphere, and maximum measurement accuracy is required, both the corrections of the embodiment of FIG. 2 and the corrections of the embodiment of FIG. 3 must be made. Additional corrections are possible in the presence of still other transit-time deviations caused by a medium of propagation. The common idea is always to determine the propagation-medium-induced transit-time error of the interrogation signal. The normally fixed time difference between the reception of the interrogation signal and the transmission of the reply signal is then corrected so that the transit-time errors are reduced or eliminated.

An embodiment in which both the tropospheric and the ionospheric errors are corrected will now be explained with the aid of FIG. 4. The block diagram of FIG. 4 is composed of the block diagrams of FIGS. 1 to 3. Like devices are designate by like reference characters with primes added.

The signal received by an antenna 1''' is fed through a circulator 2''' to mixer 3'''. The output signal of the mixer 3''' is applied to two bandpass filters 7''' and 8''', which are followed by trigger-pulse generating devices 4''' and 9''', respectively. The output signals of the latter are fed to a device 10''' for measuring the time difference $\Delta\tau$. The output signal of the trigger-pulse-generating device 9''' (instant $\tau_1$) is applied to a variable delay line 12'''. The output signal of time-measuring device 10''' ($\Delta\tau$) is fed to computer 11''', which is also fed with the values $f_1$, $f_2$, $f_3$ and with the coordinates of the interrogator ($X_S$, $Y_S$, $Z_S$), which were determined by demodulator 13'''. The input signal for the demodulator 13''' is the output signal of the mixer 3'''. Measuring device 14''' determines the refractive index Ns of the troposphere and feeds this value to the computer 11'''. The latter is also fed with the coordinates of the transponder, $X_B$, $Y_B$, $Z_B$, longitude and latitude. From these values, the computer 11''' calculates a correcting value by which the normally fixed delay in the transponder is shortened, as described above. The correcting value is applied to the variable delay line 12'''. The output signal of the variable delay line 12''' controls a transmitter 6''', which delivers the reply signal with the frequency $f_3$.

Longitude and latitude are sometimes referred to herein as $\lambda$ and $\phi$, respectively.

What is claimed is:

1. In a two-way ranging system comprised of an interrogator for transmitting an interrogation signal through the atmosphere, and a transponder having means for receiving said interrogation signal, means for determining the time of arrival of said interrogation signal, and means for transmitting a reply signal to said interrogator through the atmosphere after a fixed delay following the reception of said interrogation signal, an improvement comprising:

means at said transponder for determining the deviation of the interrogation signal transit time from the nominal transit time due to propagation conditions of said interrogation signal through the atmosphere, and means at said transponder for shortening said fixed delay before said reply signal is transmitted as a function of said determined deviation of said interrogation signal transit time, whereby said transmit time deviations of said interrogation and reply signals are eliminated to a very large extent.

2. A two-way ranging system as defined in claim 1, wherein said interrogator transmits two interrogation signals having different frequencies $f_1$ and $f_2$, said transponder includes means for determining the respective times of arrival $\tau_1$ and $\tau_2$ of said two interrogation signals, means for determining the difference $\Delta\tau$ between said two times of arrival, and said means at said transponder for shortening said fixed delay includes means for determining said deviation on the basis of said time difference and said frequencies of said two interrogation signals, and means for determining the value by which said fixed delay is shortened as a function of said two frequencies and said determined deviation of transit time.

3. A two-way ranging system as defined in claim 2 wherein said last named means includes means for taking into account the frequency of the reply signal ($f_3$) in the determination of the value by which said fixed delay is shortened.

4. A two-way ranging system as defined in claim 2 wherein said means for determining the value by which said fixed delay is shortened is calculated in accordance with the equation:

$$2\Delta t = \frac{2(\tau_1 - \tau_2)}{1 - \frac{f_1^2}{f_2^2}}$$

where $\tau_1$ and $\tau_2$ are the times of arrival of the two interrogation signals with the frequencies $f_1$ and $f_2$.

5. A two-way ranging system as defined in claim 2 wherein said means for determining the value by which said fixed delay is shortened is equal to $\Delta t + \Delta t'$, where $\Delta t$ is calculated in accordance with the equation:

$$\Delta t = \frac{(\tau_1 - \tau_2)}{1 - \frac{f_1^2}{f_2^2}}$$

and $\Delta t'$ is calculated in accordance with the equation $$\Delta t' = \frac{f_1^2}{f_3^2} \cdot \Delta t,$$

where $f_3$ is the frequency of the reply signal.

6. A two-way ranging system as defined in claim 4 wherein said means for determining the value by which said fixed delay is shortened is determined by the sum $\Delta t + \Delta t'$, where $\Delta t$ is the determined deviation of transit time of the interrogation signal, and $\Delta t'$ is calculated in accordance with the equation:

$$\Delta t' = \frac{f_1^2}{f_3^2} \cdot \Delta t,$$

where $f_3$ is the frequency of the reply signal.

7. A two-way ranging system as defined in claim 1 wherein said means for determining the value by which said fixed delay is shortened includes as parameters the refractive index of the medium in which the interrogation signal propagates, the height of the interrogator above sea level, and the elevation angle of the interrogator from the transponder.

8. A two-way ranging system as defined in claim 7 including means at said interrogator for transmitting position data to said transponder, and means at said transponder for determining said elevation angle from said position date received from said interrogator.

9. A two-way ranging system as defined in claim 6 including means at said transponder for measuring the refractive index of the medium of propagation.

10. A two-way ranging system as defined in claim 1 including at said transponder a first means for determining the values by which said fixed delay must be shortened, and a variable delay line responsive to said values for providing a corrected delay before responding with said reply signal.

* * * * *